March 10, 1970  L. E. DANIELS ETAL  3,499,677
CAMPING TRAILER

Filed May 6, 1968  2 Sheets-Sheet 1

INVENTORS
LAWRENCE E. DANIELS &
FLOYD R. CALLON
BY Marechal, Biebel, French & Bugg
ATTORNEYS

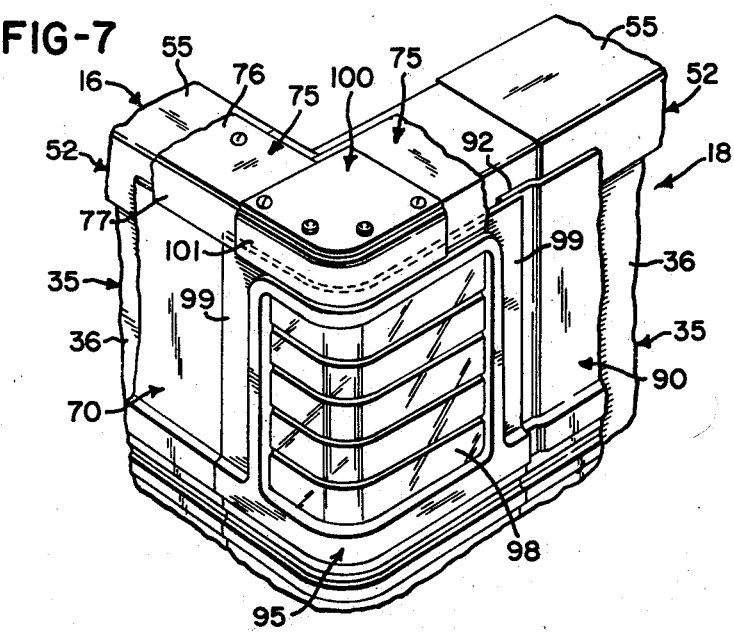
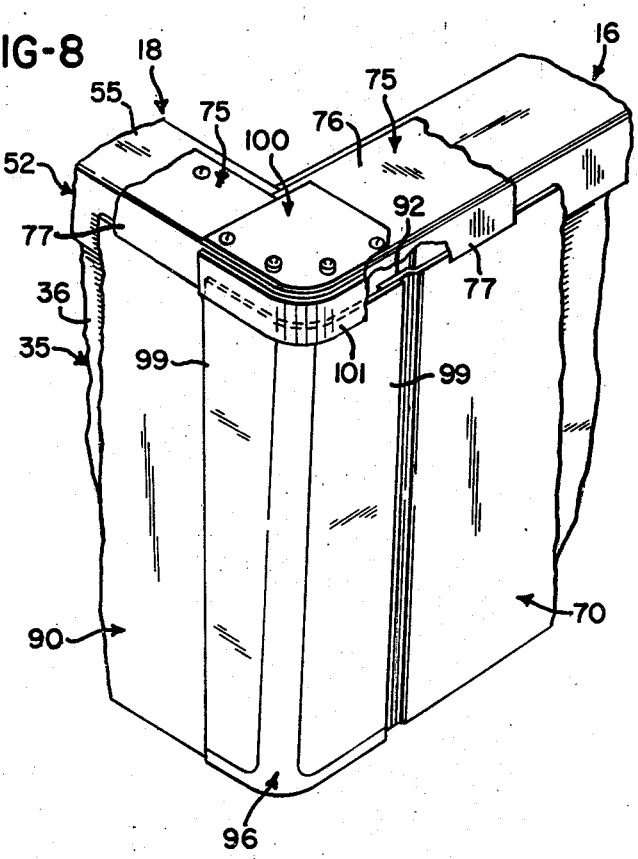

United States Patent Office 3,499,677
Patented Mar. 10, 1970

3,499,677
CAMPING TRAILER
Lawrence E. Daniels, Florence, Ky., and Floyd R. Callon, Cincinnati, Ohio, assignors to Ward Manufacturing, Inc., Cincinnati, Ohio, a corporation of Ohio
Filed May 6, 1968, Ser. No. 726,762
Int. Cl. B60p 3/32
U.S. Cl. 296—23     8 Claims

ABSTRACT OF THE DISCLOSURE

A collapsible camping trailer has a generally rectangular box-like body, a pair of extendable beds and a collapsible rigid plastic cover extending over the body. Each of the side and end walls of the body includes an outer plastic panel which is mounted for relative movement on a rigid inner support member to provide for expansion and contraction of the panel, and plastic cap members are mounted on the support members at the corners of the body for cooperation with the plastic panels and cover to provide the trailer with a highly durable outer surface.

BACKGROUND OF THE INVENTION

In a collapsible camping trailer including a two-wheel chassis supporting a generally rectangular body, it is common to provide a pair of opposing beds which are slidable between retracted positions directly over the body and extended positions projecting outwardly from opposite sides or ends of the body. It is also common to provide the trailer with a rigid top or cover which is movable between a collapsed position covering the trailer and an elevated position in which the cover cooperates with canvas side walls to form an enclosed sheltered area above the body. Usually, the outer corners of the cover are connected to the inner corners of the beds by a set of pivoted legs so that the cover moves between its collapsed and elevated positions in response to movement of the beds between their retracted and extended positions.

Commonly, the side and end walls of the body are fabricated by welding steel sheet metal panels to an inner frame structure, and the outer surfaces of the panels are painted to prevent them from rusting when exposed to rain and road spray from the tires of a towing or passing vehicle. Sometimes, a plastic panel is screwed or riveted directly to the front metal panel of the body to prevent chipping of the paint by stones projected against the trailer by the towing vehicle. It has been found, however, that even when the panels have been coated with a highly durable paint, occasionally the paint will be chipped or scratched enough to expose the raw sheet metal panel to moisture. Furthermore, it is possible for the plastic panel mounted on the front wall of the trailer to entrap moisture adjacent the supporting sheet metal panel.

SUMMARY OF THE INVENTION

The present invention is directed to a collapsible camping trailer of the character generally described above and which includes an improved body construction wherein substantially the entire outer surface of the body is formed by sheet plastic material to provide the body with high durability and corrosion resistance and to enable it to be easily cleaned. In a preferred embodiment of the invention, each side and end wall of the body incorporates an elongated sheet metal inner panel which is reinforced along its top and bottom by longitudinally extending angle portions to provide a rigid inner wall support member.

An outer thermoplastic panel is mounted on each inner wall support member and has a substantial portion of its area spaced from the inner metal panel. Preferably, each outer plastic panel is produced by vacuum forming a thermoplastic sheet and is provided with longitudinally extending ribs for reinforcement as well as appearance. The outer plastic panels are secured to the inner support members by means which provide for expansion and contraction of each plastic panel relative to its corresponding inner support member. Formed plastic caps overlap the ends of the outer plastic panels at the corners of the body and cooperate with the outer panels to provide the body with a highly durable peripheral surface.

The trailer may also incorporate a substantially rigid plastic top or cover which includes a depending peripheral skirt of substantial depth and having a lower edge extending adjacent the upper peripheral edge portion of the outer plastic wall panels. This construction not only provides the trailer with a highly durable top surface which can be easily cleaned, but also minimizes the number of joints through which water and dirt can possibly seep into the interior of the trailer.

BRIEF DESCRIPTION OF THE DRAWINGS

FIG. 7 is a perspective view of a rear corner portion of the trailer body with the adjacent bed removed and portions broken away to show details of the body construction; and FIG. 8 is a perspective view similar to FIG. 7 and showing a front corner portion of the body.

DESCRIPTION OF THE PREFERRED EMBODIMENT

Figure 1:
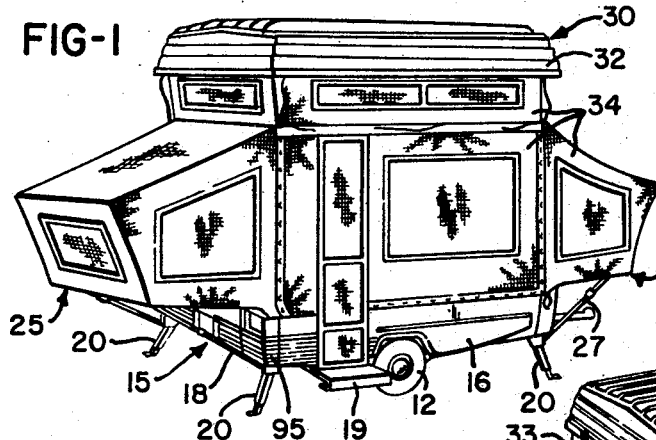
FIG. 1 is a perspective view of an erected camping trailer constructed in accordance with the invention.
Figure 2:
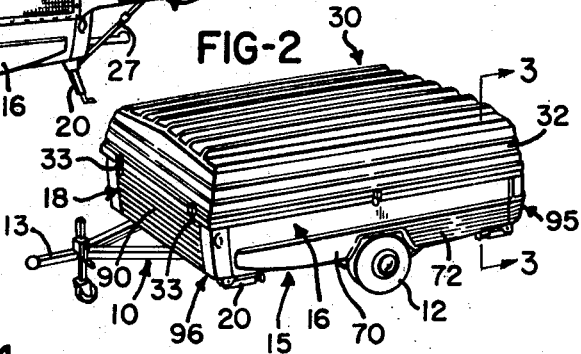
FIG. 2 is a perspective view of the trailer shown in FIG. 1 in its completely collapsed condition.

FIGS. 1 and 2 show a camping trailer including a chassis 10 with a pair of spring mounted support wheels 12 and an extending tow bar 13 for attachment to a hitch mounted on a towing vehicle. A generally rectangular body 15 is mounted on the chassis 10 and includes opposite side walls 16 and opposite end walls 18. The right sidewall 16 is provided with a door 19 having a lower portion hinged to the body for movement between a position flush with the right side wall and a lowered position (FIG. 1) where it forms a step for ascending into the body 15. Retractable jacks 20 are mounted on the lower corners of the body 15 and are adapted to be lowered and extended (FIG. 1) for stabilizing the body after the trailer is parked at a camping site.

A pair of beds 25 (FIG. 3), each including a U-shaped frame member 26 (FIG. 3) of angular cross-section, are slidably mounted on the body 15 for horizontal movement between retracted positions (FIG. 2) and extended positions (FIG. 1) wherein the beds are provided with braces 27 which extend upwardly from the jacks 20. A vacuum-formed thermoplastic cover 30, having a rectangular configuration the same as the body 15, extends over the beds 25 when they are in their retracted positions and has a depending peripheral skirt 32 which is releasably attached to the sidewalls 16 and end walls 18 of the body 15 by a plurality of toggle clamps 33.

As disclosed in copending application Ser. No. 708,616, filed Feb. 27, 1968 and assigned to the assignee of the present invention, but not forming any part of the present invention, the cover 30 is supported at each end by a pair of legs having their lower ends slidably connected to an upper bed platform which, in turn, is supported at each end by a pair of legs having their lower end portions pivotally connected to the inner corners of the beds 25. Thus to erect the trailer, the cover 30 is first elevated in relation to the upper bed platform and is then moved to its elevated position (FIG. 1) in response to movement of the beds 25 from their retracted positions to their extended positions. A flexible canvas cover 34 is attached to the periphery of the skirt 32 of the cover 30 and extends downwardly for attachment by snaps to the side walls 16 of the trailer body and to the frame members 26 of the beds 25.

Referring to FIGS. 3–8, the detailed construction of the body 15 will be described with reference to the left sidewall 16 and the adjoining front and rear corners. It is to be understood, however, that the right sidewall 16 and both end walls 18 have substantially the same cross-sectional configuration except for the area where the door 19 is located.

In accordance with the invention, each sidewall 16 and each end wall 18 incorporates an elongated inner weldment 35 including a flat vertical sheet metal panel 36 (FIG. 4) which is formed along its upper edge portion to produce an inwardly projecting upper web 37 and a downwardly extending flange 38. As shown in FIG. 5, the lower edge portion of the sheet metal panel 36 is formed to provide an inwardly projecting flange 39 which rests upon a rigid frame member 40 having a generally Z-shaped cross-sectional configuration. A floor 45, preferably formed of plywood or composite board, rests upon the lower flange 39 of the inner weldment 35 and is secured to the frame member 40 by a longitudinally extending angular clamp member 46 and a series of bolts 47.

Each inner weldment 35 also includes a formed sheet metal reinforcing or support member 52 (FIG. 4) which extends longitudinally along the upper portion of the panel 36 and has a vertical web portion 53 spaced from the panel 36 by a lower angular flange portion 54. The support member 52 also includes an inwardly projecting and longitudinally extending upper web 55 which seats on the web 37. A flange 56 extends downwardly from the web 55 and is rigidly connected to the flange 38 by spot welds. Thus the support member 52 serves to reinforce the upper longitudinal portion of the inner weldment 35.

Figure 3:
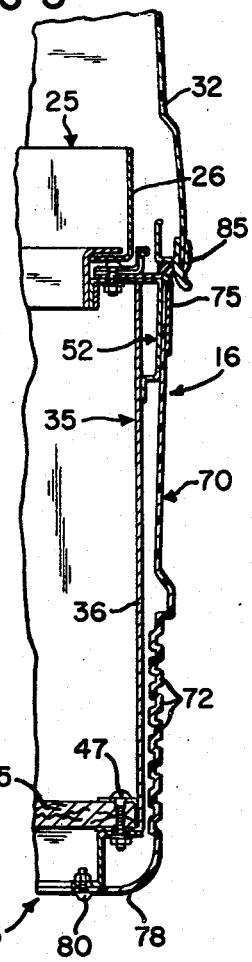
FIG. 3 is a fragmentary vertical section taken through a side wall and cover generally along the line 3—3 of FIG. 2.
Figure 4:
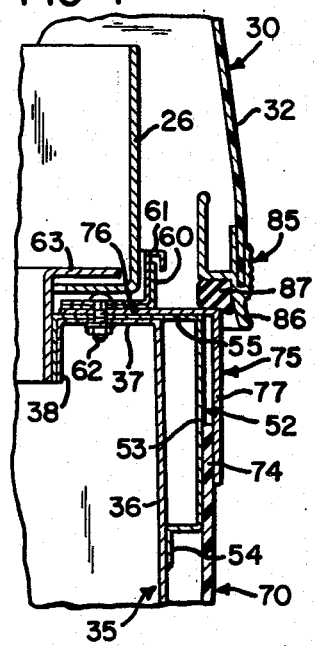
FIG. 4 is an enlarged fragmentary section of the upper portion of the side wall and cover shown in FIG. 3.
Figure 5:
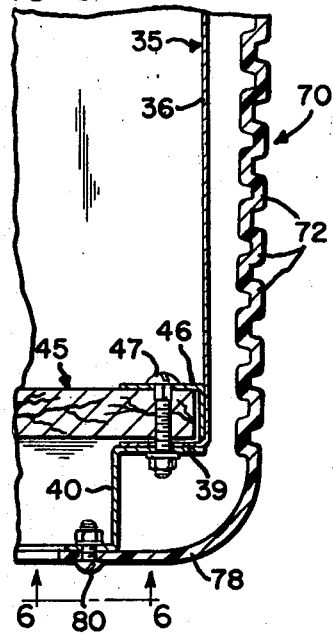
FIG. 5 is an enlarged fragmentary section of the lower portion of the side wall shown in FIG. 3.

As shown in FIGS. 3 and 4, a track 60 having an angular cross-sectional configuration is supported by the upper webs 37 and 55 of each inner sidewall weldment 35. Each track 60 is covered by a low friction plastic strip 61, and a series of bolts 62 secure each track 60 and its corresponding strip 61 to the supporting weldment 35. The tracks 60 and strips 61 provide a slidable support for each bed frame 26, and angle brackets 63 are rigidly secured to the flanges 38 and 56 of the inner sidewall weldments 35 for maintaining the beds 25 in a horizontal plane when they are extended.

The left sidewall 16 further includes an elongated outer plastic wall panel 70 (FIG. 3) which preferably is vacuum-formed in the same manner as the cover 30 and includes longitudinally extending reinforcing ribs 72. The outer wall panel 70 has an upper longitudinally extending edge portion 74 (FIG. 4) which seats on the support member 52 of the inner weldment 35. An aluminum angular trim strip 75 is mounted on the support member 52 and includes an inwardly extending flange 76 which is clamped between the corresponding track 60 and the upper web 55 of the inner weldment 35. The trim strip 75 also has a downwardly extending flange 77 which overlaps the upper edge portion 74 of the outer panel 70 for retaining the edge portion 74 adjacent the web portion 53 of the weldment 35.

Figure 6:
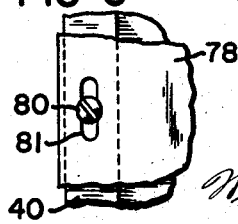
FIG. 6 is a fragmentary view looking upwardly generally on the line 6—6 of FIG. 5.

Referring to FIGS. 3, 5 and 6, the outer plastic panel 70 has a lower longitudinally extending edge portion 78 which curves inwardly and is secured to the lower surface of the frame member 40 by a series of longitudinally spaced bolts 80. The bolts 80 extend through corresponding slots 81 (FIG. 6) formed within the lower edge portion 78 of the outer plastic panel 70 to provide for longitudinal movement of the panel 70 relative to the corresponding frame member 40.

As shown in FIGS. 3 and 4, an aluminum trim strip 85 is secured to the lower edge portion of the peripheral skirt 32 of the cover 30 and includes a downwardly depending lip or flange 86 which overlaps the metal trim strip 75 extending around the upper periphery of the body 15. A resilient seal member 87 is secured to the trim strip 85 and engages the trim strip 75 when the trailer is collapsed to prevent water from being splashed or sprayed into the interior of the body 15.

The respective inner weldments 35 of the sidewalls 16 and end walls 18 are rigidly connected at the corners of the body 15 by welding the web portions 37 and 55 of the adjacent weldments. The outer plastic panel 70 of each sidewall 16 and the corresponding outer plastic panels 90 of each end wall 18, however, stop short of the corners and are each provided with a vertically extending and inwardly offset end portion 92 as shown in FIGS. 7 and 8.

A cap member 95 (FIG. 7) of angular cross-section is mounted on each rear corner of the body 15, and a similar cap member 96 (FIG. 8) is mounted on each front corner of the body. The cap members 95 and 96 are preferably constructed by vacuum-forming a thermoplastic sheet in the same manner as the outer panels 70 and 90 are formed. The rear cap members 95 are each provided with a rectangular opening for receiving a red transparent plastic lens 98 which serves as a protective cover for a stoplight and a taillight (not shown) enclosed within the body. Each of the cap members 95 and 96 has vertically extending edge portions 99 which overlap the end portions 92 of the adjacent outer plastic wall panels 70 and 90 and thereby retain the ends of the plastic wall panels.

As shown in FIGS. 7 and 8, the upper edge portion of each of the corner cap members 95 and 96 is retained by the flange 77 of the adjacent trim strips 75 and also by an aluminum retaining cap 100 having an overlapping depending flange 101. The lower portions (not shown) of the corner cap members 95 and 96 are formed inwardly in the same manner as each of the outer wall panels 70 and 90 and are secured to the adjacent frame members 40 by the bolts 80.

A camping trailer constructed in accordance with the present invention provides several desirable features and advantages. For example, by providing each sidewall 16 and each end wall 18 with an outer plastic panel 70 and 90, respectively, and by connecting the adjacent side and end wall panels with the plastic corner caps 95 and 96, the body 15 is provided with a highly durable peripheral surface which will not chip or corrode as is common with trailer bodies having outer sheet metal panels with painted surfaces.

The mounting of each of the outer plastic panels 70 and 90 on its corresponding inner wall weldment 35 is also important. That is, by retaining the upper edge portion of each of the outer plastic panels 70 and 90 by the flange 77 of the corresponding trim strip 75 and by providing a slot 81 within the lower edge portion of each outer panel for each retaining bolt 80, each outer plastic panel can expand and contract according to the environmental temperature without causing buckling and warping of the panel. The differential movement between the outer plastic panels and the corresponding inner metal weldments is especially significant in view of the fact that the coefficient of thermal expansion of the thermoplastic material forming the outer wall panels 70 and 90 is more than ten times the coefficient of thermal expansion of the sheet steel forming the inner weldments 35.

The spacing between each plastic outer wall panel 70 and its corresponding inner wall panel 36 also provides an important feature. This construction prevents the entrapment of moisture between each of the outer wall panels 70 or 90 and its corresponding inner sheet metal panel 36, although the spacing is sufficiently small so that each inner sheet metal panel 36 forms a backup support for its corresponding outer plastic panel in the case the latter is accidentally forced inwardly with a substantial impact or force.

The overlapping relationship of the corner cap members 95 and 96 and the adjacent outer plastic wall panels 70 and 90 also provides for expansion and contraction of the outer wall panels. As shown in FIG. 8, the vertical edge portions 92 of the plastic outer wall panels 70 and 90 can slide relative to the inner surfaces of the vertical edge portions 99 of the adjoining cap members. Moreover, by retaining the outer wall panels 70 and 90 and cap members 95 and 96 in the manner illustrated, a tight fit is maintained between the edge portions 92 and 99 to prevent any significant amount of moisture from seeping therebetween. However, if any water does seep between the edge portions 92 and 99, the water is free to run downwardly along the inner surface of a plastic outer wall panel or corner cap member and drip from its lower edge.

As mentioned above, the deep depending skirt 32 on the cover 30 also provides an important advantage. That is, by having the skirt portion 32 of sufficient depth to cover the beds 25 in their retracted position and by fastening the skirt to the upper edge portions of the sidewalls 16 and end walls 18 with the latches 33, there is only one peripheral joint between the cover 30 and the body 15. This single joint is highly desirable in that it minimizes the areas where water could possibly seep into the interior of the body 15. Moreover, the seal member 87 cooperates with the trim strip 85 and the trim strip 75 to prevent any water from being sprayed or seeping into the interior of the body 15.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A camping trailer comprising a generally rectangular box-like body having opposite sidewalls and opposite end walls, wheel means supporting said body, bed means mounted on said body and movable between a retracted position within said body and an extended position projecting outwardly from said body, cover means movable between a collapsed position adjacent said body and an elevated position spaced substantially above said body, each of said side walls and each of said end walls of said body including an elongated outer plastic wall panel and a rigid inner support member for said panel, means for supporting each said panel for sliding movement relative to its corresponding said inner support member to provide for substantial thermal expansion and contraction of said panels, and corner wall means located at the corners of said body for connecting said side wall panels to said end wall panels to provide said body with a substantially durable peripheral surface.

2. A trailer as defined in claim 1 wherein said corner wall means each comprise a plastic cap member for each corner of said body, each said cap member having edge portions overlapping the adjacent said side and end wall panels, and means for mounting said cap members on the inner support members to provide for sliding movement of said side wall and end wall panels relative to the overlapping said cap members.

3. A trailer as defined in claim 1 wherein each said outer plastic wall panel includes a longitudinally extending lower portion curving inwardly, and means for retaining said lower portion of each said panel to provide for longitudinal movement of said panels.

4. A trailer as defined in claim 1 wherein said cover means includes a rigid plastic cover member having a peripheral depending skirt portion with a lower edge extending adjacent said side wall panels and said end wall panels when said cover member is in said collapsed position.

5. A trailer as defined in claim 1 wherein each said inner support member comprises an elongated inner sheet metal panel positioned substantially parallel to the corresponding said outer wall panel, and means for spacing a substantial portion of each said outer wall panel from the corresponding said inner sheet metal panel to prevent the entrapment of moisture therebetween.

6. A trailer as defined in claim 1 wherein each said wall of said body includes an angular trim strip extending longitudinally along the upper portion thereof, means for securing each said trim strip to the corresponding inner support member, and a depending flange portion on each said strip overlapping the upper edge portion of the corresponding said outer wall panel for retaining said outer wall panel and to provide for sliding movement of said panel relative to the corresponding said strip.

7. A camping trailer comprising a wheel-supported body including opposite sidewalls and opposite end walls, bed means mounted on said body and movable between a retracted position within said body and an extended position projecting outwardly from said body, a collapsible cover for said body, each said wall including an outer thermoplastic panel of substantially uniform wall thickness and forming substantially the entire outer surface thereof, each said wall further including an inner rigid member supporting the corresponding panel, and thermoplastic wall means joining said panels together at the corners of said body to provide the entire peripheral surface of said body with substantial durability.

8. A camping trailer as defined in claim 7 wherein said cover comprises a substantially rigid thermoplastic cover member having a depending peripheral skirt portion with a lower edge positioned adjacent said panels when said cover member is collapsed.

References Cited

UNITED STATES PATENTS 3,219,383  11/1965  Nerem _____ 296—23
3,377,098  4/1968  Bontrager _____ 296—27

PHILIP GOODMAN, Primary Examiner

U.S. Cl. X.R.

52—66